April 26, 1960   R. F. ENO   2,934,718
MAGNETIC MODULATOR
Filed Feb. 26, 1954

*INVENTOR.*
ROBERT F. ENO
BY William R. Lane
ATTORNEY () # United States Patent Office 2,934,718
Patented Apr. 26, 1960

2,934,718
MAGNETIC MODULATOR

Robert F. Eno, Long Beach, Calif., assignor to North American Aviation, Inc.

Application February 26, 1954, Serial No. 412,705

4 Claims. (Cl. 332—51)

This invention pertains to a magnetic modulator, and in particular to an improved magnetic modulator having superior output voltage characteristics.

In prior known magnetic modulators, the amplitude of the output voltage is a linear function of the amplitude of the input voltage over the operating range. The amplitude of the output voltage then stops increasing with increasing amplitude of input voltage. Further increases of the amplitude of the input voltage causes a decrease in the output voltage. The rate of decrease in this range is equal to the rate of increase in the operating range of the modulator.

The device contemplated by this invention reduces the slope of the output voltage as a function of the input voltage in the decreasing range of output voltage.

It is therefore an object of this invention to provide a magnetic modulator having superior output voltage characteristics.

It is another object of this invention to provide a new magnetic modulator.

It is yet another object of this invention to provide an improved magnetic modulator.

Other objects of invention will become apparent from the following description taken in connection with the accompanying drawings in which—

Figure 3:
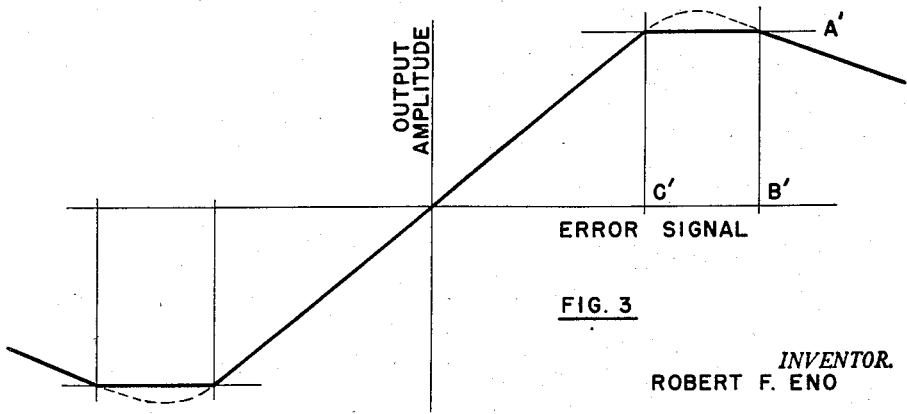

And Fig. 3 is a graph of output vs. input voltage of the device of this invention.

Figure 1:
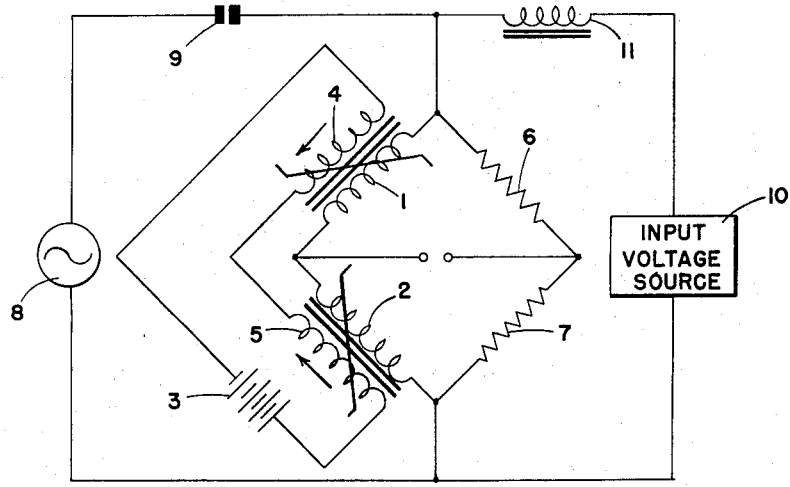
Fig. 1 is a schematic diagram of the device of this invention.

In Fig. 1, saturable reactor 1 is connected in series with saturable reactor 2. Saturable reactors 1 and 2 are oppositely biased by means of voltage source 3 and windings 4 and 5. The direction of bias is indicated in Fig. 1 by the arrows near each winding. Saturable reactors 1 and 2 form two arms between the input terminals of a Wheatstone bridge. Equal valued resistors 6 and 7 are connected in series to form the other two arms of the Wheatstone bridge. The Wheatstone bridge, comprising saturable reactors 1 and 2 as well as resistors 6 and 7 forms the improved magnetic modulator of this invention. Carrier alternating current voltage source 8 is connected through blocking condenser 9 to the input of the Wheatstone bridge of saturable reactors 1 and 2 and resistors 6 and 7. The modulating input voltage source 10 is connected through blocking choke 11 to the input of the Wheatstone bridge of saturable reactors 1 and 2 and resistors 6 and 7.

Figure 2:
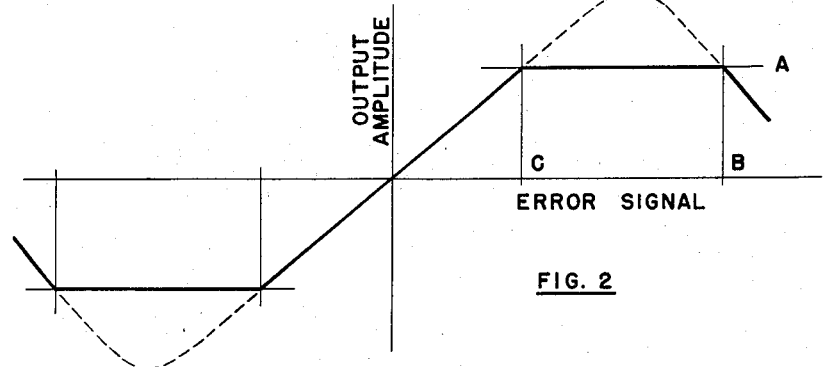
Fig. 2 is a graph of output vs. input voltage of a conventional magnetic modulator.

Magnetic modulator circuits function to convert D.-C. signals of low level to A.-C. signals of usable magnitude, the A.-C. output signal varying in accordance with the input signal, and reversing in phase with change in polarity of the input signal. Conventional circuits of this nature, however, exhibit characteristics having steep negative slope portions, for example as graphed in Fig. 2, and which pose serious difficulties in servo system applications in particular. When the error (input) signal is large enough to cause operation to take place beyond either bend of this characteristic, the servo system feed-back is then of wrong sense, resulting in aggravation rather than correction of the condition from which the error signal results. While this reversal of feed-back can be avoided by sufficiently limiting the amplitude of the output signal, for example, as indicated by ordinate A in Fig. 2, the resultant large reduction in linear range is undesirable. So limited, the magnetic modulator can be overdriven by error signals having nearly the magnitude indicated by abscissa B without running into feed-back reversal, but the linear range in this case extends only to abscissa C.

The Fig. 3 graph represents the improved characteristic of the magnetic modulator here disclosed. The portions lying beyond the bends are negative in slope as before, but are of considerably lesser slope. As indicated by comparison of the Fig. 3 graph to that given in Fig. 1, it is apparent that the improved characteristic extends the effective dynamic range of operation.

While prior known magnetic modulators are very unstable for high values of input voltage, the device of this invention is less unstable at any particular value of high input voltage.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A magnetic modulator comprising a bridge having two parallel current branches between the input terminals of said bridge, one said branch comprising two identical series-connected saturable reactors, the second said branch comprising two identical series-connected resistors, means for establishing a fixed operating point of said saturable reactors, an alternating current voltage source and an input voltage source connected in parallel across said input terminals of said bridge to provide current through said two parallel current branches.

2. A magnetic modulator comprising an alternating current voltage source and an input voltage source connected in parallel, a combination of two saturable reactors connected in series, means for biasing said saturable reactors, and a combination of two identical resistors connected in series, said combination of saturable reactors being connected in parallel with said combination of resistors and said voltage sources.

3. A magnetic modulator comprising a pair of input terminals and a pair of output terminals, voltage division means connected across said input terminals and to one of said output terminals for maintaining one said output terminal at a substantially constant potential intermediate the voltage between said input terminal, a pair of series-connected saturable reactors connected across said input terminals, means for biasing said saturable reactors a predetermined amount, the junction between said saturable reactors being connected to provide the second said output terminal, an alternating current voltage source and an input voltage source connected across said input terminals.

4. A magnetic modulator comprising a bridge circuit having a pair of current branches connected in parallel between input terminals of said bridge, one of said current branches comprising a pair of saturable reactors connected in series, the other of said current branches comprising a pair of resistors connected in series, an alternating current voltage source and an input voltage source connected in parallel across said input terminals to provide current through said parallel branches, inductor means connected in series between said input voltage source and one of said input terminals to prevent alternating current flow from said input signal source to said input terminals, means for oppositely biasing said saturable reactors with a predetermined constant voltage, the junction between said saturable reactors and the junction between said resistors developing output voltages of a magnitude proportional to said input signal source and a frequency equal to that of said alternating current voltage source.

References Cited in the file of this patent

UNITED STATES PATENTS

| | | |
|---|---|---|
| 1,824,577 | Sorensen | Sept. 22, 1931 |
| 2,037,756 | Bohm et al. | Apr. 21, 1936 |
| 2,432,399 | Edwards | Dec. 9, 1947 |
| 2,472,980 | Miller et al. | June 14, 1949 |
| 2,585,654 | Hewlett | Feb. 12, 1952 |
| 2,760,148 | Sakamoto | Aug. 21, 1956 |
| 2,781,420 | Eno | Feb. 12, 1957 |